Patented Jan. 4, 1938

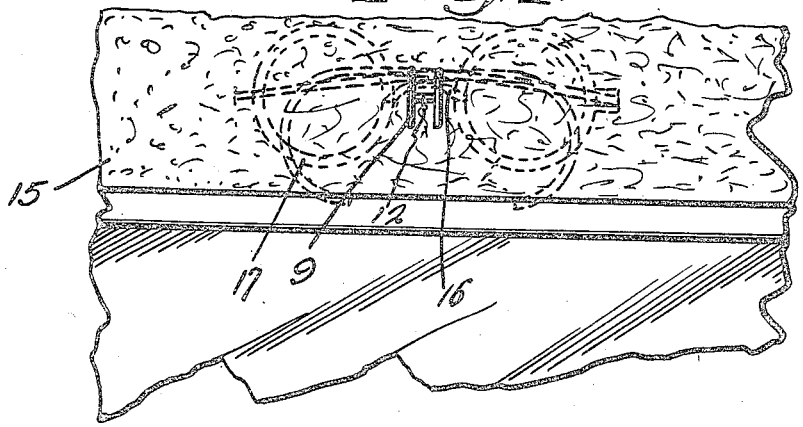
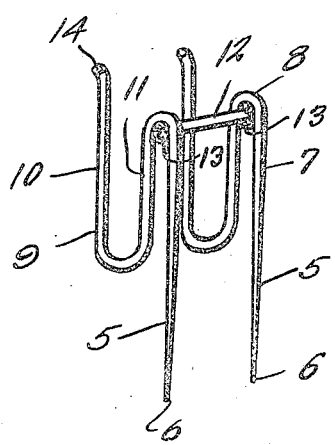
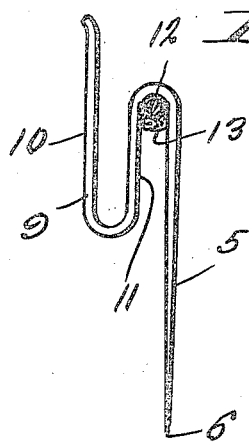

2,104,612

UNITED STATES PATENT OFFICE 2,104,612

SUPPORTING PIN FOR EYEGLASSES AND THE LIKE

Henry E. Droll, Rowena, Tex.

Application July 14, 1937, Serial No. 153,657

1 Claim. (Cl. 24—3)

The present invention relates to supports for eye-glasses and the like and has for its primary object to provide a pin structure adapted for insertion in the upholstery of an automobile body to support a pair of sun glasses in a convenient position to the driver.

A further object is to provide a supporting pin structure of this character which is strong and durable, relatively inexpensive to manufacture, which may be easily and conveniently placed in a desired supporting position and which is otherwise well adapted for the purposes for which the same was intended.

Other objects and advantages reside in the details of construction as more fully hereinafter described and claimed, reference being had to the accompanying drawing forming part hereof, wherein like numerals refer to like parts throughout and in which:

Figure 1 is a fragmentary elevational view of a portion of an automobile body showing the supporting pin in position thereon.

Figure 2 is a perspective view of the pin and

Figure 3 is a side elevational view thereof.

Referring now to the drawing in detail, the invention comprises a pair of duplicate pin members 5, each of which includes the usual pointed end 6 and shank portion 7. The shank 7 is preferably formed of relatively stiff wire bent intermediate their ends as at 8 to provide a U-shaped support 9 having the leg portions 10 and 11 disposed in parallel relation with respect to the shank portion 7 of the pin.

The bent portion 8 connecting the shank 7 and the U-shaped supporting members 9 of each of the pins are connected in spaced parallel relation by a cross bar 12 secured within each of the bends by solder 13 or the like. The pointed ends 6 of the pins extend oppositely from the ends 14 of the free leg portions 10 of the U-shaped supporting members and accordingly by inserting the pins 6 in an upright position in the upholstery 15 of an automobile body the spaced U-shaped supporting members 9 will form a trough within which to support the bridge portion 16 of a pair of sun glasses 17 or the like.

It is believed the details of construction and manner of use of the device will be readily understood from the foregoing without further detailed explanation.

What is claimed is:—

A pin support of the class described comprising a pair of duplicate pins having one end blunt and their opposite ends pointed and embodying shank portions bent intermediate their ends to provide a pair of U-shaped supporting members adjacent the blunt end of the pin and having the leg portions thereof disposed in spaced parallel relation with respect to the shanks of the respective pins and joined to the shank adjacent the pointed end of the pin by a return bend and a bar member having its ends secured within the bend forming the junction between the shank and U-shaped member of the respective pins to secure said pins and said U-shaped members in spaced parallel relation.

HENRY E. DROLL.